(12) United States Patent
Hamilton

(10) Patent No.: US 9,830,939 B1
(45) Date of Patent: Nov. 28, 2017

(54) WORKLOAD BALANCING FOR MULTIPLE ACTUATORS

(71) Applicant: Western Digital Technologies, Inc., Irvine, CA (US)

(72) Inventor: David M. Hamilton, Lake Forest, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 15/386,702

(22) Filed: Dec. 21, 2016

(51) Int. Cl.
*G11B 5/55* (2006.01)
*G11B 20/12* (2006.01)

(52) U.S. Cl.
CPC .... *G11B 5/5578* (2013.01); *G11B 2020/1224* (2013.01); *G11B 2020/1292* (2013.01)

(58) Field of Classification Search
CPC ......... G11B 5/012; G11B 5/02; G11B 5/5578; G11B 20/12; G11B 20/1217; G11B 2020/1218; G11B 2020/1224; G11B 2020/1232–2020/1234; G11B 2020/1241–2020/1242; G11B 2020/1289; G11B 2020/1292
USPC .......................... 360/55, 69, 75, 78.04, 78.12
See application file for complete search history.

(56) References Cited

U.S. PATENT DOCUMENTS

| | | | | |
|---|---|---|---|---|
| 5,341,351 A * | 8/1994 | Ng | ......................... | G06F 3/0601 360/78.12 |
| 5,901,010 A | 5/1999 | Glover et al. | | |
| 6,502,178 B1 * | 12/2002 | Olbrich | .............. | G11B 20/1217 711/112 |
| 6,690,549 B1 * | 2/2004 | Aikawa | ................ | G11B 5/4813 360/264.4 |
| 6,892,250 B2 * | 5/2005 | Hoskins | ................ | G06F 3/0611 710/40 |
| 7,102,842 B1 * | 9/2006 | Howard | ............... | G11B 5/5521 360/78.12 |
| 7,324,301 B2 * | 1/2008 | Tormasi | ................... | G11B 5/02 360/78.12 |
| 7,770,076 B2 * | 8/2010 | Mills | .................... | G06F 11/1076 360/47 |
| 8,154,823 B2 * | 4/2012 | Saga | .................... | G11B 5/5552 360/78.12 |
| 8,819,333 B2 * | 8/2014 | Walls | .................. | G06F 11/2087 711/103 |
| 9,122,408 B2 * | 9/2015 | Walls | .................. | G06F 11/2087 |

* cited by examiner

*Primary Examiner* — Wayne Young
*Assistant Examiner* — James L Habermehl
(74) *Attorney, Agent, or Firm* — Barry IP Law

(57) ABSTRACT

A Data Storage Device (DSD) includes at least one disk surface and a plurality of actuators for accessing data stored on the at least one disk surface. A workload is determined for each actuator of the plurality of actuators, and a logical to physical mapping is modified based on at least one workload. The logical to physical mapping associates logical addresses of data with physical locations for storing the data on the at least one disk surface.

22 Claims, 5 Drawing Sheets

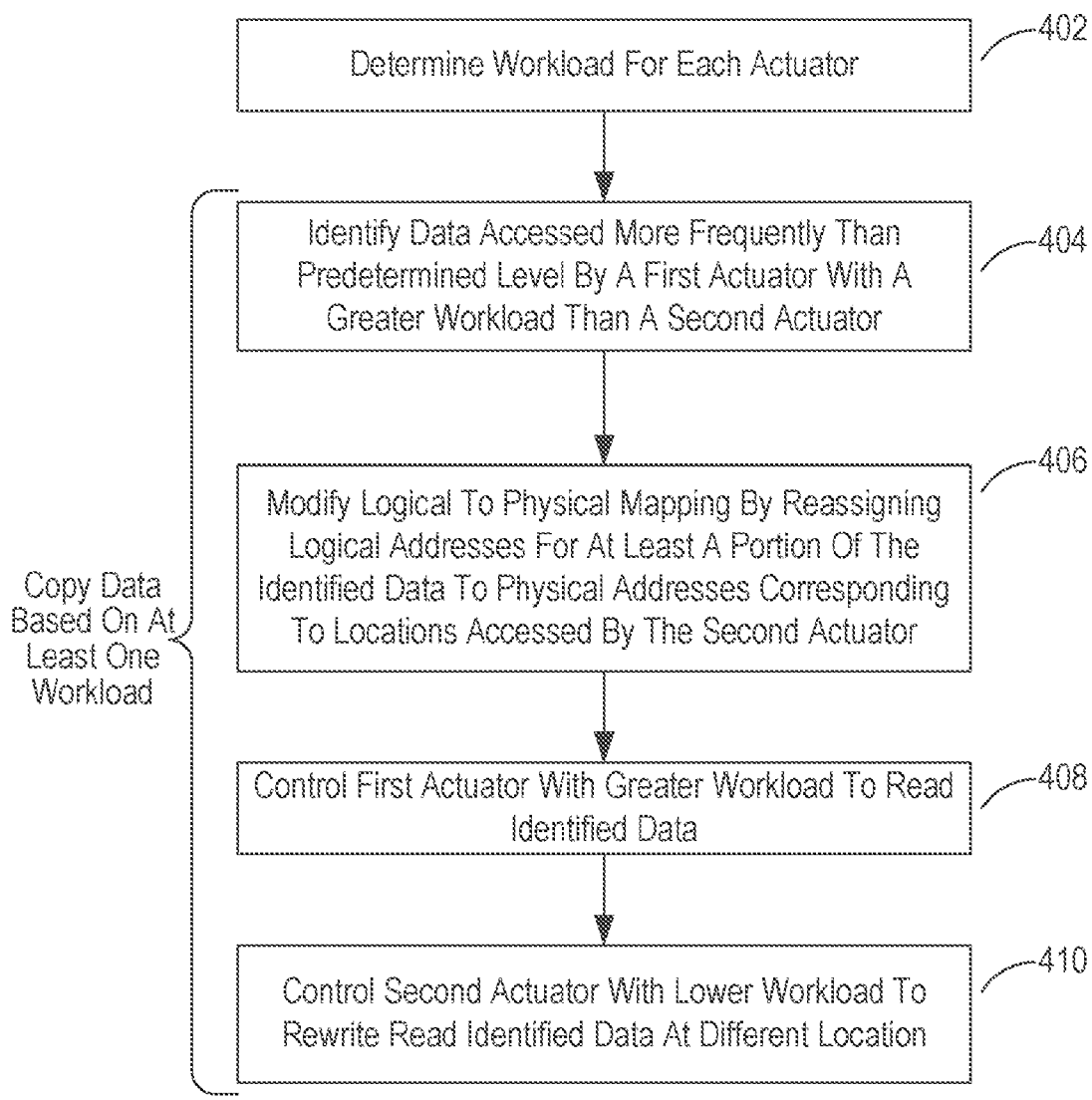

WORKLOAD BALANCING FOR MULTIPLE ACTUATORS

BACKGROUND

Data Storage Devices (DSDs) are often used to record data onto or to reproduce data from a storage media. One type of storage media includes a rotating magnetic disk, such as in a Hard Disk Drive (HDD) or a Solid-State Hybrid Drive (SSHD). In such DSDs, a magnetic head is positioned in relation to a disk to read and write data in tracks on a surface of the disk. The head is typically located on a distal end of an actuator moved by a Voice Coil Motor (VCM).

As one way of improving the performance of DSDs including a magnetic disk, multiple actuators may be used to independently position different heads for either the same disk surface or for different disk surfaces. The independent actuators can allow for simultaneously reading and/or writing data in different areas of the same disk surface, or in areas that are not radially aligned on different disk surfaces.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

FIG. 3 is a flowchart for a mapping modification process based on at least one actuator workload according to an embodiment.

FIG. 4 is a flowchart for a mapping modification process including reassignment of logical addresses for previously stored data according to an embodiment.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

System Overview

Figure 1:
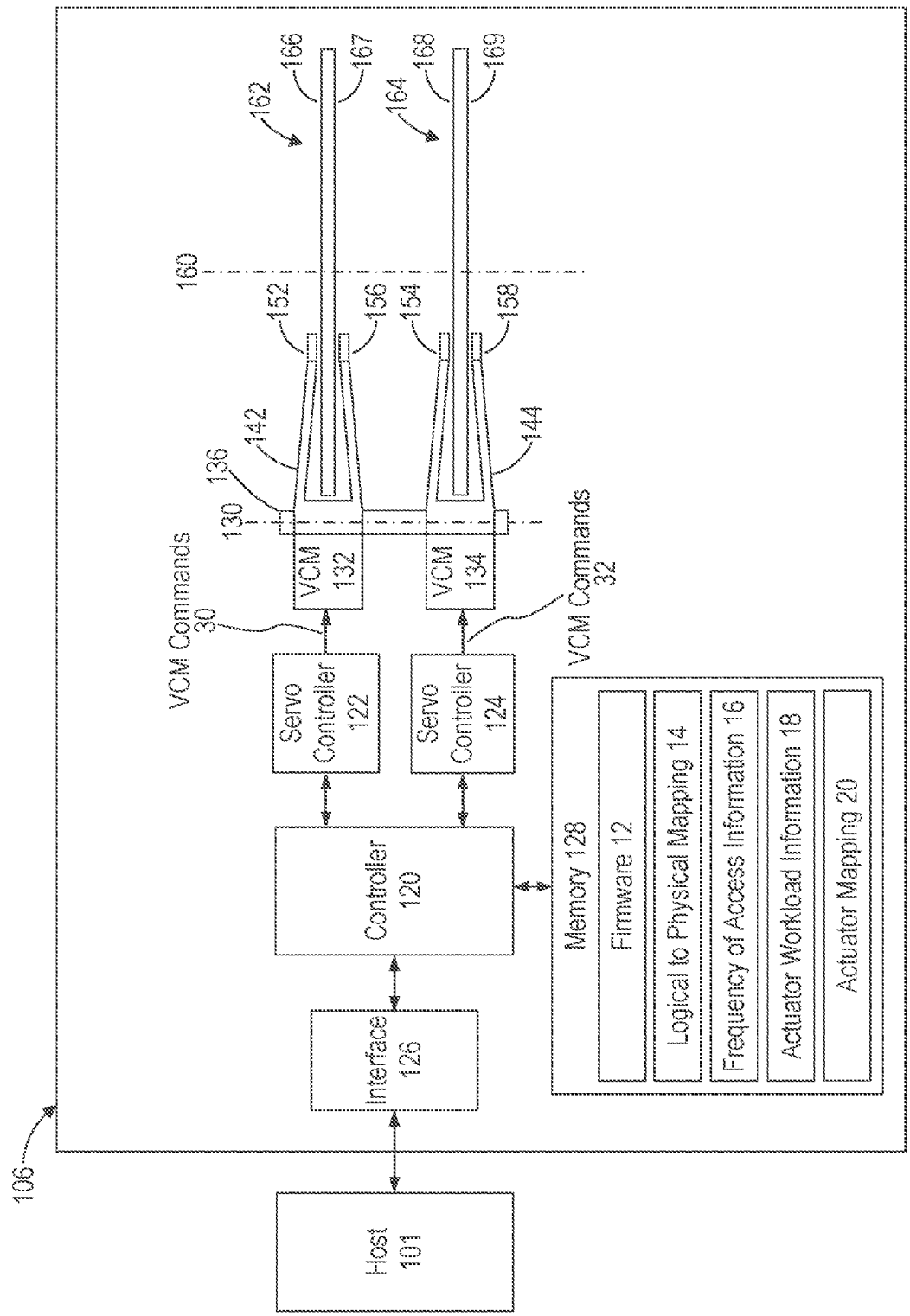
FIG. 1 is a block diagram of a Data Storage Device (DSD) with independent actuators in a split coaxial configuration according to an embodiment.

FIG. 1 shows an example of Data Storage Device (DSD) 106 which communicates with host 101 according to an embodiment. Host 101 and DSD 106 may form a system, such as a computer system (e.g., server, desktop, mobile/laptop, tablet, smartphone, etc.), or other electronic device such as a Digital Video Recorder (DVR). The components of FIG. 1 may or may not be physically co-located. In this regard, host 101 may be located remotely from DSD 106.

Those of ordinary skill in the art will appreciate that other embodiments can include more or less than those elements shown in FIG. 1 and that the disclosed processes can be implemented in other environments with different configurations. For example, other embodiments can include a different actuator configuration, such as in FIG. 2, or a different number of actuators than those shown in FIG. 1.

As shown in the example of FIG. 1, DSD 106 includes Non-Volatile Memory (NVM) in the form of rotating magnetic disks 162 and 164. In other embodiments, DSD 106 may include a different number of disks or a different type of NVM such as a solid-state memory in addition to one or more rotating magnetic disks.

DSD 106 includes controller 120, which includes circuitry such as one or more processors for executing instructions and can include a microcontroller, a Digital Signal Processor (DSP), an Application-Specific Integrated Circuit (ASIC), a Field Programmable Gate Array (FPGA), hard-wired logic, analog circuitry and/or a combination thereof. In some implementations, controller 120 can include a System On a Chip (SoC).

Interface 126 is configured to interface DSD 106 with host 101 via a bus or network, and may interface using, for example, Ethernet or WiFi, or a bus standard such as Serial Advanced Technology Attachment (SATA), PCI express (PCIe), Small Computer System Interface (SCSI), or Serial Attached SCSI (SAS). As will be appreciated by those of ordinary skill in the art, interface 126 can be included as part of controller 120.

In the example of FIG. 1, disks 162 and 164 form a disk pack that is rotated by a spindle motor (not shown) about disk axis 160. Heads 152, 154, 156, and 158 are positioned to read and write data on a corresponding disk surface of disks 162 or 164. Each of disk surfaces 166, 167, 168, and 169 includes a number of radially spaced, concentric tracks for storing data, such as tracks 161 shown in FIG. 2.

Heads 152 and 156 are connected to a distal end portion of actuator 142, which is rotated by Voice Coil Motor (VCM) 132 to position heads 152 and 156 in relation to tracks on disk surfaces 166 and 167, respectively. Similarly, heads 154 and 158 are connected to a distal end portion of actuator 144, which is rotated by VCM 134 to position heads 154 and 158 in relation to tracks on disk surfaces 168 and 169, respectively.

In the example of FIG. 1, actuators 142 and 144 rotate independently from each other about actuator pivot 136, which is centered about actuator axis 130. In this regard, actuators 142 and 144 are in a split coaxial configuration that allows the heads on actuators 142 and 144 to access areas of disks 162 and 164 that are not radially aligned with each other. This rotational independence of actuators 142 and 144 can allow for an improvement in the performance of DSD 106 over DSDs with only a single actuator in terms of Input/Output Operations Per Second (IOPS). In more detail, the independent movement of actuators 142 and 144 can facilitate simultaneous reading and/or writing in different radial locations to perform more commands in a given amount of time.

However, the benefits of being able to access different radial locations or non-aligned areas at the same time are reduced if a disproportionate amount of commands are performed by one actuator as compared to another. In other words, the performance of DSD 106 can ordinarily be improved by better balancing or more evenly distributing the number of commands performed or the distance travelled by each actuator (i.e., an actuator workload). As discussed in more detail below, the present disclosure provides for modifying a logical to physical mapping that associates logical addresses with physical locations for storing data to better balance actuator workloads.

In the example of FIG. 1, controller 120 provides servo controllers 122 and 124 with commands for accessing portions of disks 162 and 164. Those of ordinary skill in the art will appreciate that in some implementations, servo controllers 122 and 124 may form part of controller 120. Servo controllers 122 and 124 send VCM commands 30 and 32, respectively, to VCMs 132 and 134 to control movement of actuators 142 and 144 in positioning heads in relation to the disk surfaces of disks 162 and 164. In more detail, each disk surface of disks 162 and 164 can include servo wedges (not shown) that can provide location information (e.g., a servo burst) that can be read from the disk surface by a head to determine a position of the head. Servo controllers 122 and 124 may also control rotation of disks 162 and 164 with a spindle motor control signal.

In some implementations, servo controllers 122 and 124 may keep track of a number of commands performed for its respective actuator 142 or 144, and return this information to controller 120 for use as actuator workload information 18. In other implementations, controller 120 may keep track of a number of commands performed for each actuator based on commands sent to each of servo controllers 122 and 124.

Memory 140 of DSD 106 is configured to store firmware 12, logical to physical mapping 14, frequency of access information 16, and actuator workload information 18. In some implementations, memory 140 can be a volatile memory such as Dynamic Random Access Memory (DRAM) with copies of one or more of firmware 12, logical to physical mapping 14, frequency of access information 16, and actuator workload information 18 stored in an NVM such as on disks 162 or 164, or in another NVM of DSD 106. In other implementations, memory 128 can be an NVM, such as a Magnetoresistive Random Access Memory (MRAM), or other type of non-volatile solid-state memory.

Firmware 12 includes computer executable instructions for execution by controller 120 in operating DSD 106. As discussed in more detail below, controller 120 can execute firmware 12 to allow for the modification of logical to physical mapping 14 to more evenly distribute workloads for actuators 142 and 144.

Logical to physical mapping 14 associates logical addresses of data with physical locations for storing the data on the disk surfaces of disks 162 and 164. In some implementations, logical to physical mapping 14 can include a translation table or other data structure, or a portion of such a data structure. For example, logical to physical mapping 14 can include a translation table that maps Logical Block Addresses (LBAs) of data to Physical Block Addresses (PBAs) indicating a location on a disk surface, such as a particular sector or range of sectors in a particular track on the disk surface. The logical addresses in logical to physical mapping 14 can be expressed, for example, as address ranges.

Frequency of access information 16 can indicate a current or a predicted frequency of access for data stored in DSD 106. In other implementations, frequency of access information 16 may be included as part of, or in the same data structure as logical to physical mapping 14.

In some implementations, controller 120 may determine frequency of access information by logging a number of read and/or write commands for different logical addresses or ranges of logical addresses. In other implementations, controller 120 may determine frequency of access information by logging a number of read and/or write commands for different physical addresses or ranges of physical addresses. Current frequency of access information may be, for example, collected over a predetermined amount of time, or since an event such as a last power-up or an initial power-up of DSD 106. In some cases, frequency of access information may be aged or weighted so that more recent accesses are given more weight in representing the current frequency of access for logical addresses.

Frequency of access information 16 may also consider predicted frequencies of access that may be based on hinting from host 101 that can indicate higher or lower frequencies of access for particular logical addresses or ranges of logical addresses. For example, host 101 may provide an indication in the form of a file type or a priority level that indicates that certain logical addresses are expected to be accessed more or less frequently than other logical addresses.

Actuator workload information 18 includes information representing an amount of work performed by each of actuators 142 and 144. In some implementations, actuator workload information 18 can include a number of VCM commands 30 or 32 to move a respective actuator. In other implementations, actuator workload information 18 can represent a distance travelled by the actuator, such as a number of tracks accessed by a head of the actuator. Actuator workload information 18 may be, for example, collected over a predetermined amount of time, or since an event such as a last power-up or an initial power-up of DSD 106. In some cases, workload information may be aged or weighted so that more recent information (e.g., more recent VCM commands or more recently travelled distances) is given more weight in the actuator workloads stored in actuator workload information 18.

Actuator mapping 20 can include a data structure that maps physical addresses on disks 162 and 164 to the actuator (i.e., actuator 142 or 144) that accesses the physical addresses. The physical addresses may be represented in actuator mapping 20 as ranges of physical addresses accessed by each actuator. In some implementations, actuator mapping 20 may be arranged based on head mapping information indicating which head accesses different physical addresses. In addition, actuator mapping 20 in some implementations may be included as part of logical to physical mapping 14.

In operation, interface 126 receives host read and write commands from host 101 via interface 126 for reading data from and writing data on disk surfaces of disks 162 and 164. In response to a write command from host 101, controller 120 may buffer the data to be written for the write commands in memory 140 or another memory.

For data to be written on a disk surface, a read/write channel (not shown) of controller 120 may encode the buffered data into a write signal, which is provided to a head for magnetically writing data on a disk surface that has been assigned logical addresses for the data in the write command. In addition, controller 120 via servo controller 122 or 124 can provide VCM commands to VCM 132 or VCM 134 to position the head over a particular track for writing the data.

In response to a read command for data stored on a disk surface of disk 162 or 164, controller 120 via servo controller 122 or 124 positions a head over a particular track on a disk surface that has been assigned logical addresses for the data in the read command. Controller 120 controls the head to magnetically read data stored in the track, and to send the read data as a read signal to a read/write channel of controller 120. The read/write channel can then decode and buffer the data into memory 140 or another memory for transmission to host 101 via interface 126.

Figure 2:
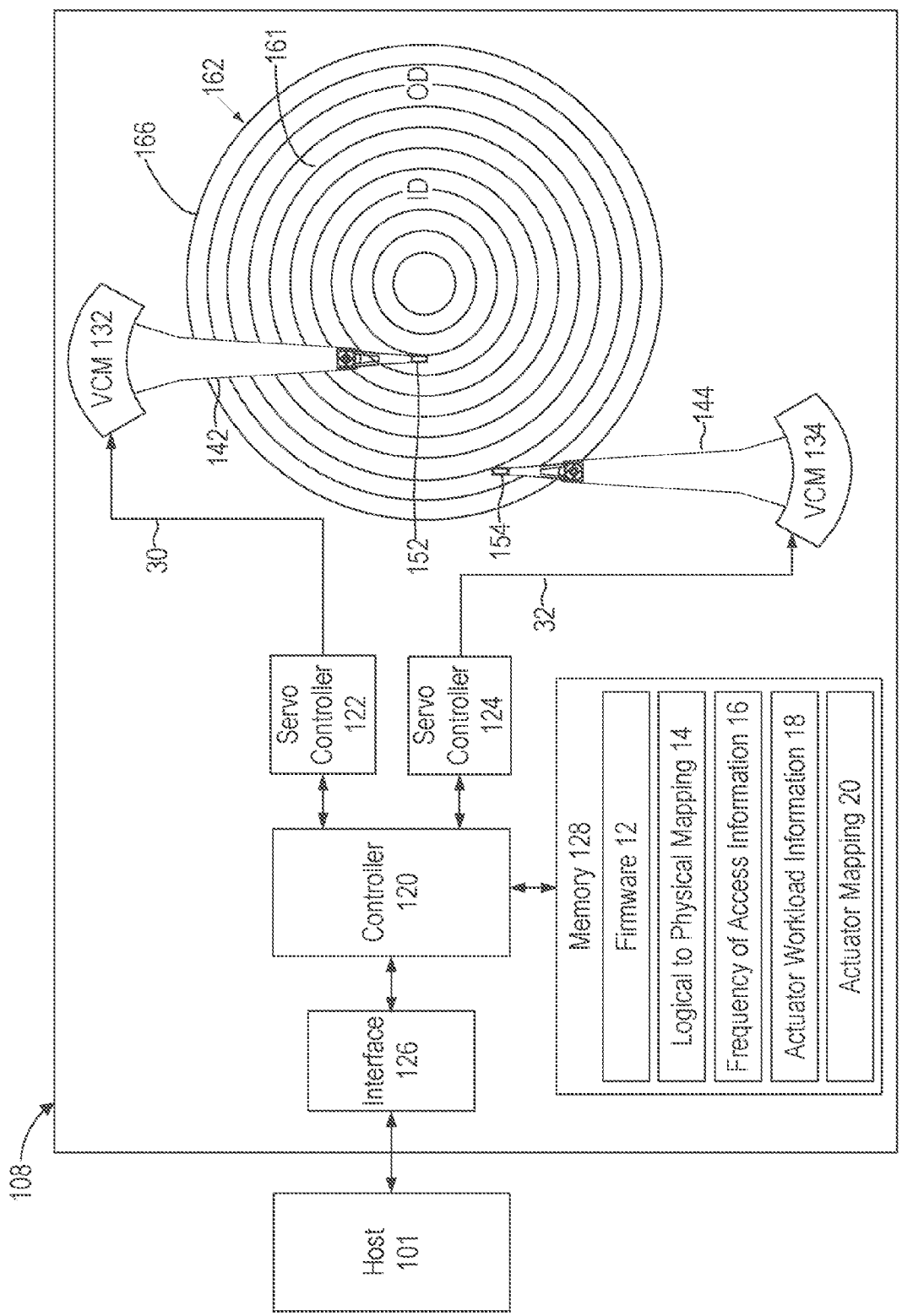
FIG. 2 is a block diagram of a DSD with independent actuators in a dual axial configuration according to an embodiment.

FIG. 2 is a block diagram of DSD 108, which like DSD 106 of FIG. 1, includes independent actuators according to an embodiment. An understanding of the same numbered components of DSD 108 in FIG. 2 can be obtained with reference to the corresponding reference numbers discussed above for FIG. 1. As with the example of FIG. 1, those of ordinary skill in the art will appreciate that other embodiments can include more or less than those elements shown in FIG. 2 and that the disclosed processes can be implemented in other environments with different configurations.

In contrast to DSD 106 in FIG. 1, actuators 142 and 144 in DSD 108 of FIG. 2 are in a dual axial configuration where each actuator rotates about its own axis of rotation. In addition, heads 152 and 154 located on actuators 142 and 144, respectively, access different radial areas of the same disk surface 166 of disk 162. In this regard, head 152 accesses tracks 161 in an Inner Diameter (ID) portion of disk surface 166, while head 154 accesses tracks 161 in an Outer Diameter (OD) portion of disk surface 166. A performance of DSD 108 (e.g., IOPS) is ordinarily improved as compared to DSDs with a single actuator by being able to simultaneously access different radial areas of disk surface 166. In particular, and as with DSD 106 in FIG. 1, the independent movement of actuators 142 and 144 can facilitate simultaneous reading and/or writing in different radial locations to perform more commands in a given amount of time.

However, the benefits of being able to access different radial locations of disk surface 166 at the same time are reduced if a disproportionate amount of commands are performed by one actuator as compared to another. In other words, as with DSD 106 in FIG. 1, the performance of DSD 108 can be further improved by better balancing or more evenly distributing the number of commands performed or the distance travelled by each actuator. By modifying logical to physical mapping 14 based on at least one actuator workload, it is ordinarily possible to better balance or more evenly distribute actuator workloads to improve the performance of DSD 108.

Example Mapping Modification Processes

FIG. 3 is a flowchart for a mapping modification process that can be performed by controller 120 executing firmware 12 according to an embodiment. The process of FIG. 3 may be performed periodically, such as after a certain number of operations have been performed by a DSD or after a certain amount of time has elapsed since an event such as a last power-up or an initial power-up. In some implementations, the process of FIG. 3 may be performed as part of a maintenance activity or during an idle period when other commands are not being performed on one or more disk surfaces. As one example, the process of FIG. 3 may be performed as part of a garbage collection operation to reclaim portions of disk surfaces storing invalid or obsolete data. In such garbage collection operations, valid data may be relocated or copied to other locations identified using an actuator workload.

In block 302, controller 120 determines a workload for each of actuators 142 and 144, such as by accessing actuator workloads stored in actuator workload information 18. The workload may be determined using previously calculated information in actuator workload information 18 or recalculated or updated workload information to provide a more current actuator workload. As discussed above, the actuator workloads may indicate an amount of movement for an actuator by being based on a number of commands to move an actuator or a distance travelled by the actuator, such as a number of tracks accessed by a head of the actuator. This information can be, for example, collected over a predetermined amount of time, or since an event such as a last power-up or an initial power-up of the DSD. Controller 120 may also age or weight workload information (e.g., the number of commands or distance travelled) so that more recent information is given more weight in the determined workload. Updated workload information may be stored as, or as part of, actuator workload information 18.

In block 304, controller 120 modifies logical to physical mapping 14 based on at least one actuator workload. As discussed in more detail below with reference to FIGS. 4 and 5, the modification can include reassigning logical addresses (e.g., LBAs) of data already stored on the disk surfaces of disks 162 and 164, or assigning at least one logical address for data to be written on a disk surface so as to better balance or more evenly distribute actuator workloads. This can ordinarily improve future performance in accessing data since it is more likely that different sets of frequently accessed data can be simultaneously accessed by different actuators.

FIG. 4 is a flowchart for a mapping modification process including reassignment of logical addresses for previously stored data according to an embodiment. The process of FIG. 4 can, for example, be performed by controller 120 executing firmware 12. As with the mapping modification process of FIG. 3, the process of FIG. 3 may be performed periodically, such as after a certain number of operations have been performed by a DSD, or after a certain amount of time has elapsed since an event such as a last power-up or an initial power-up. In some implementations, the process of FIG. 4 may be performed as part of a maintenance activity (e.g., garbage collection) or during an idle period when other commands are not being performed on one or more disk surfaces.

In block 402, controller 120 determines a workload for each of actuators 142 and 144. As discussed above, the workload may be determined using previously calculated information in actuator workload information 18 or recalculated or updated workload information to provide a more current actuator workload. The actuator workload can, for example, be based on a number of commands to move the actuator or a distance travelled by the actuator, such as a number of tracks accessed by a head of the actuator. Controller 120 may also age or weight workload information (e.g., the number of commands or distance travelled) so that more recent information is given more weight in determining the workload. Updated workload information may be stored as, or as part of, actuator workload information 18. In blocks 404 to 410, controller 120 copies data stored on at least one disk surface to a different location based on at least one workload determined in block 402. In more detail, data is identified in block 404 that is accessed more frequently than a predetermined level by a first actuator with a greater workload than a second actuator. For example, with reference to DSD 106 in FIG. 1, controller 120 may determine that actuator 142 has a greater workload than actuator 144 using actuator workload information 18. Controller 120 in block 402 may then use logical to physical mapping 14, frequency of access information 16, and actuator mapping 20 to identify data accessed by actuator 142 (i.e., data stored on disk surfaces 166 and 167) that has been accessed for reading and/or writing more than a predetermined level of 10 accesses in the past two days. In such an example, actuator mapping 20 can be used to identify physical addresses accessed by actuator 142, and logical to physical mapping 14 and/or frequency of access information 16 can be used to identify corresponding data that has been accessed by actuator 142 more than the predetermined level.

In block 406, controller 120 modifies logical to physical mapping 14 by reassigning logical addresses (e.g., LBAs) for at least a portion of the data identified in block 404 to physical addresses (e.g., PBAs) corresponding to locations accessed by the second actuator with the lower workload. In one implementation, controller 120 in block 406 may first use actuator workload information 18 to identify an actuator with a lower workload, and then use actuator mapping 20 to identify physical addresses that are accessed by the lower workload actuator. Controller 120 can then use logical to physical mapping 14 to determine which of the identified physical addresses are available for storing the copied data.

Continuing with the example discussed above for block 404, controller 120 would reassign logical addresses for frequently accessed data stored on disk surfaces 166 and/or 167 (i.e., accessed by higher workload actuator 142) to physical addresses corresponding to locations on disk surfaces 168 and/or 169 that are accessed by lower workload actuator 144.

With reference to the example of DSD 108 in FIG. 2, actuator 142 may have a higher workload in accessing the ID portion of disk surface 166 than the workload of actuator 144 in accessing the OD portion of disk surface 166. In this case, controller 120 in block 406 reassigns logical addresses for frequently accessed data stored in the ID portion (i.e., accessed by higher workload actuator 142) to physical addresses corresponding to locations in the OD portion that are accessed by lower workload actuator 144.

In block 408, controller 120 controls the first actuator (e.g., actuator 142) via a servo controller (e.g., servo controller 122) and a VCM (e.g., VCM 132) to read the data identified in block 404. The read data is rewritten using the second actuator (e.g., actuator 144) with the lower workload at a different location. In some implementations, logical addresses associated with the previous physical location for the copied data can be marked invalid or made available for storing other data by, for example, removing the logical address for the previous physical address from logical to physical mapping 14.

Figure 5:
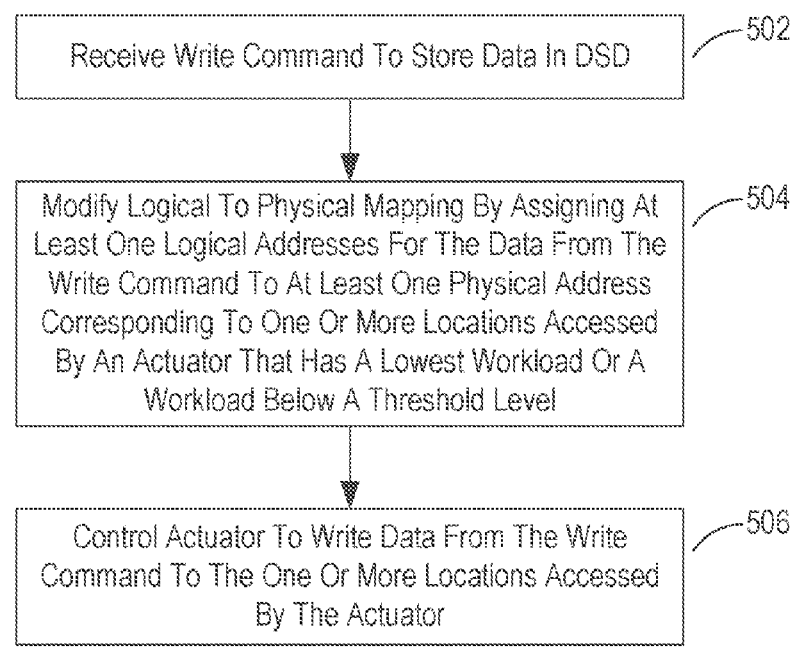
FIG. 5 is a flowchart for a mapping modification process including assignment of logical addresses for data from a write command according to an embodiment.

FIG. 5 is a flowchart for a mapping modification process including assignment of logical addresses for data from a write command according to an embodiment. The process of FIG. 5 can, for example, be performed by controller 120 executing firmware 12, and may be initiated by receiving a write command to store data in the DSD.

In block 502, a write command is received via interface 126, such as from host 101, to store data in the DSD. The write command can include the data to be stored in the DSD with one or more logical addresses for the data.

In block 504, controller 120 modifies logical to physical mapping 14 by assigning at least one logical address for the data from the write command to at least one physical address corresponding to one or more locations accessed by an actuator that has a lowest workload or a workload below a threshold level. Controller 120 can use actuator workload information 18 to identify an actuator that has the lowest workload or a workload below a threshold level, such as, for example, a threshold number of tracks traveled or a threshold number of commands to move an actuator. In some implementations, the threshold level can allow for a certain amount of actuator use to take place before having to remove any actuators as candidates for writing data from write commands.

Physical addresses accessed by the actuator with the lowest workload or the one or more actuators with workloads below the threshold level can be determined using actuator mapping 20. These physical addresses can then be compared to physical addresses in logical to physical mapping 14 to identify physical addresses available for storing the data from the write command.

Controller 120 may consider additional factors in assigning at least one logical address from the write command. In one example, controller 120 may use a Rotational Position Optimization (RPO) algorithm in assigning logical addresses to physical addresses. An RPO algorithm can allow for read and write commands to be ordered for performance to reduce the amount of actuator movement needed in performing commands. In another example, controller 120 may consider additional information received from host 101, such as a priority level for the data from the write command or an expected frequency of access for the data.

In block 506, controller 120 controls the actuator with the lowest workload or a workload below the threshold level to write data from the write command to one or more locations accessed by the actuator. Controller 120 may control the actuator via a servo controller and VCM.

By writing data using an actuator with the lowest workload or a workload below the threshold level, it is ordinarily possible to improve performance in two ways. First, the initial activity of writing the data is performed by a lower workload actuator that is less likely to be performing, or scheduled to perform, other operations which may cause a delay in performing commands. Second, recently written data is generally more likely to be accessed again than less recently written data. This can allow for better workload balancing over time so that it will be more likely that frequently accessed data is more evenly distributed among independent actuators allowing more opportunities for simultaneous reading and writing of data.

Figure 6:
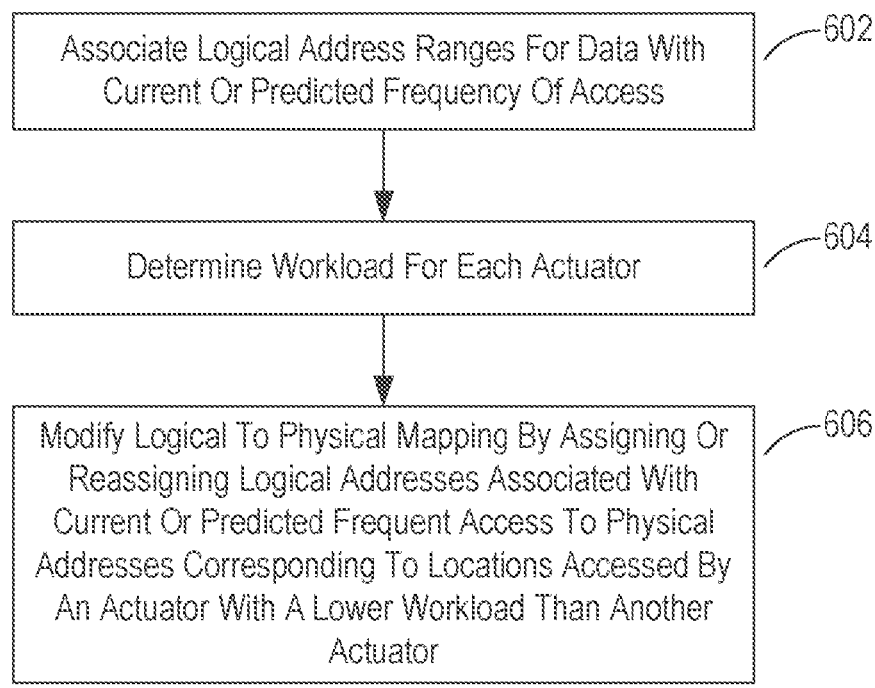
FIG. 6 is a flowchart for a mapping modification process including the assignment or reassignment of logical addresses associated with current or predicted frequent access according to an embodiment.

FIG. 6 is a flowchart for a mapping modification process including the assignment or reassignment of logical addresses associated with current or predicted frequent access according to an embodiment. The process of FIG. 6 can, for example, be performed by controller 120 executing firmware 12. The mapping modification process may be performed periodically, such as after a certain number of operations have been performed by a DSD, or after a certain amount of time has elapsed since an event such as a last power-up or an initial power-up. In some implementations, the process of FIG. 6 may be performed as part of a maintenance activity or during an idle period when other commands are not being performed on one or more disk surfaces.

In block 602, controller 120 associates logical address ranges for data with current or predicted frequencies of access. This association may be made, for example, in frequency of access information 16 or in logical to physical mapping 14.

As discussed above, controller 120 may determine frequency of access information by logging a number of read and/or write commands for different logical addresses or ranges of logical addresses. Current frequency of access information may be, for example, collected over a predetermined amount of time, or since an event such as a last power-up or an initial power-up of DSD 106. In some cases, frequency of access information may be aged or weighted so that more recent accesses are given more weight in representing the frequency of access for logical addresses or physical addresses.

Predicted frequencies of access may be, for example, based on hinting from host 101 that can indicate higher or lower frequencies of access for particular logical addresses or ranges of logical addresses. For example, host 101 may provide an indication in the form of a file type or a priority level that indicates that certain logical addresses are expected to be accessed more or less frequently than other logical addresses.

In block 604, a workload is determined for each actuator using actuator workload information 18. As discussed above, actuator workload information 18 may be based on factors such as a number of commands to move an actuator or a distance travelled by an actuator. This information can be collected over a predetermined amount of time, or since an event such as a last power-up or an initial power-up of the DSD. Actuator workload information 18 may also represent information that has been aged or weighted so that more recent information is given more weight in determining the workload.

In block 606, controller 120 modifies logical to physical mapping 14 by assigning or reassigning logical addresses associated with current or predicted frequent access to physical addresses corresponding to locations accessed by an actuator with a lower workload than another actuator. The actuator with the lower workload may be, for example, a different actuator with a lowest workload. In other implementations, the actuator with the lower workload can include a different actuator other than a current actuator with a highest workload or other actuators that have a workload lower than a threshold level.

The modification in block 606 can apply to either a reassignment situation as in FIG. 4, where frequently accessed data is copied to an area serviced by an actuator with a lower workload, or an assignment situation where data received from a write command is assigned on the fly to an actuator with a lower workload based on a predicted frequency of access.

Figure 7:
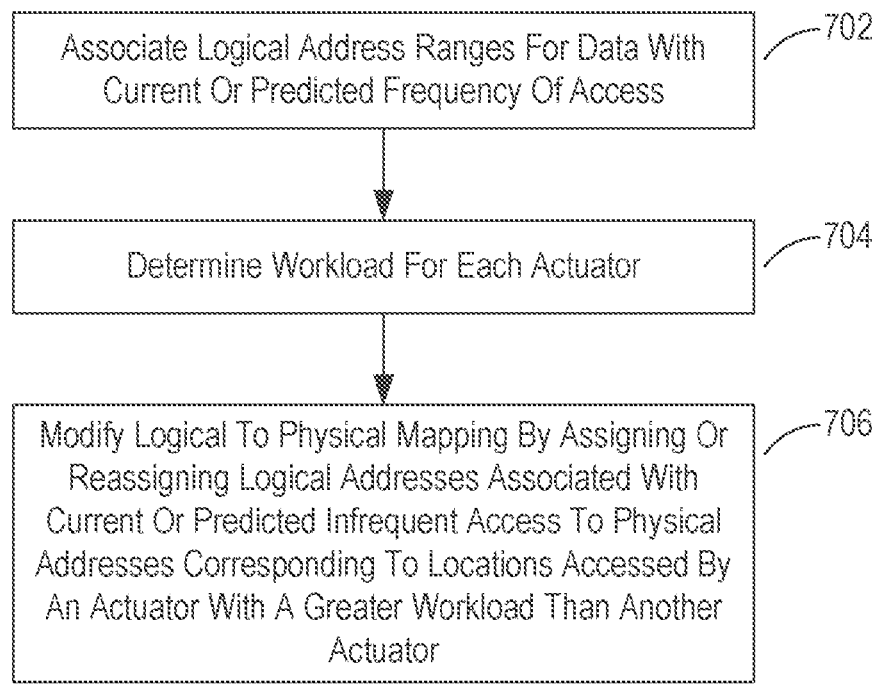
FIG. 7 is a flowchart for a mapping modification process including the assignment or reassignment of logical addresses associated with current or predicted infrequent access according to an embodiment.

FIG. 7 is a flowchart for a mapping modification process including the assignment or reassignment of logical addresses associated with current or predicted infrequent access according to an embodiment. As with the mapping modification process of FIG. 6, the process of FIG. 7 can, for example, be performed by controller 120 executing firmware 12. The mapping modification process may be performed periodically, such as after a certain number of operations have been performed by a DSD, or after a certain amount of time has elapsed since an event such as a last power-up or an initial power-up. In some implementations, the process of FIG. 7 may be performed as part of a maintenance activity or during an idle period when other commands are not being performed on one or more disk surfaces.

An understanding of blocks 702 and 704 can be obtained with reference to the description above for blocks 602 and 604 of FIG. 6, so a description of these blocks is not reproduced here.

In block 706, controller 120 modifies logical to physical mapping 14 by assigning or reassigning logical addresses associated with current or predicted infrequent access to physical addresses corresponding to locations accessed by an actuator with a greater workload than another actuator. The actuator with the greater workload may be, for example, a different actuator with a highest workload. In other implementations, the actuator with the greater workload can include any actuator other than a current actuator with a lowest workload, or other actuators that have a workload greater than a threshold level.

The modification in block 706 can apply to either a reassignment situation where infrequently accessed data is copied to an area serviced by an actuator with a greater workload, or an assignment situation where data received from a write command is assigned on the fly to an actuator with a greater workload based on a predicted frequency of access. The modification of block 706 provides for the opposite relationship of the modification performed in block 606 of FIG. 6. In this regard, controller 120 may perform both the modification processes of FIGS. 6 and 7 or combine these processes so that frequently accessed data is copied or written to locations accessed by actuators with a lower workload, and infrequently accessed data is copied or written to locations accessed by actuators with a greater workload. As discussed above, such balancing or distribution of actuator workloads can better take advantage of the benefits of independent actuators to simultaneously access data in different radial locations.

OTHER EMBODIMENTS

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes a processor or computer to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, and controllers described in connection with the examples disclosed herein may be implemented or performed with a general purpose processor, a DSP, an ASIC, a FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The activities of a method or process described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC).

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive and the scope of the disclosure is, therefore, indicated by the following claims rather than by the foregoing description. All changes which come within the meaning and range of equivalency of the claims are to be embraced within their scope.

What is claimed is:

1. A Data Storage Device (DSD), comprising:
   at least one disk surface for storing data;
   a plurality of actuators actuating heads for accessing data stored on the at least one disk surface, wherein at least one of the actuators is configured to be moved independently from another one of the actuators; and
   a controller configured to:
      determine a workload for each of at least two of the plurality of actuators; and
      based on at least one determined workload, modify a logical to physical mapping associating logical addresses of data with physical locations for storing the data on the at least one disk surface.

2. The DSD of claim 1, wherein the controller is further configured to copy data stored on the at least one disk surface to a different location on the at least one disk surface based on the at least one determined workload by:
   controlling a first actuator of the plurality of actuators to read data from the at least one disk surface; and
   controlling a second actuator of the plurality of actuators to rewrite the read data at the different location on the at least one disk surface.

3. The DSD of claim 2, wherein a first workload for the first actuator is greater than a second workload for the second actuator.

4. The DSD of claim 1, further comprising:
   an actuator pivot about which a first actuator and a second actuator of the plurality of actuators rotate;
   a first Voice Coil Motor (VCM) for rotating the first actuator about the actuator pivot; and
   a second VCM for rotating the second actuator about the actuator pivot.

5. The DSD of claim 1, further comprising:
   a first actuator pivot about which a first actuator of the plurality of actuators rotates; and
   a second actuator pivot about which a second actuator of the plurality of actuators rotates.

6. The DSD of claim 1, wherein the controller is further configured to:
   identify data stored on the at least one disk surface that is accessed more frequently than a predetermined level by a first actuator of the plurality of actuators with a first workload greater than a second workload for a second actuator; and
   in modifying the logical to physical mapping, reassign logical addresses for at least a portion of the identified data to physical addresses corresponding to locations on the at least one disk surface that are accessed by the second actuator.

7. The DSD of claim 1, wherein the controller is further configured to:
   receive a write command to store data in the DSD; and
   wherein modifying the logical to physical mapping includes assigning at least one logical address for the data from the write command to at least one physical address corresponding to one or more locations on the at least one disk surface.

8. The DSD of claim 7, wherein the controller is further configured to assign the at least one logical address to at least one physical address corresponding to one or more locations accessed by an actuator that has a lowest workload of the plurality of actuators or a workload below a threshold level.

9. The DSD of claim 1, wherein the controller is further configured to:
   associate logical address ranges for data with a current or predicted frequency of access of the data; and
   in modifying the logical to physical mapping, assign or reassign logical addresses associated with current or predicted frequent access to physical addresses corresponding to locations on the at least one disk surface accessed by an actuator with a lower workload than another actuator of the plurality of actuators.

10. The DSD of claim 1, wherein the controller is further configured to:
    associate logical address ranges for data with a current or predicted frequency of access of the data; and
    in modifying the logical to physical mapping, assign or reassign logical addresses associated with current or predicted infrequent access to physical addresses corresponding to locations on the at least one disk surface accessed by an actuator with a greater workload than another actuator of the plurality of actuators.

11. The DSD of claim 1, wherein each workload of the at least one determined workload corresponds to a number of commands to move a respective actuator of the plurality of actuators or a distance travelled by a respective actuator of the plurality of actuators.

12. A method of operating a Data Storage Device (DSD) including at least one disk surface for storing data and a plurality of actuators for accessing data on the least one disk surface, the method comprising:
    determining a workload for each actuator of the plurality of actuators; and
    based on at least one workload, modifying a logical to physical mapping associating logical addresses of data with physical locations for storing the data on the at least one disk surface.

13. The method of claim 12, further comprising copying data stored on the at least one disk surface to a different location on the at least one disk surface based on the at least one workload by:
    controlling a first actuator of the plurality of actuators to read data from the at least one disk surface; and
    controlling a second actuator of the plurality of actuators to rewrite the read data at the different location on the at least one disk surface.

14. The method of claim 13, wherein a first workload for the first actuator is greater than a second workload for the second actuator.

15. The method of claim 12, further comprising:
identifying data stored on the at least one disk surface that is accessed more frequently than a predetermined level by a first actuator with a first workload greater than a second workload for a second actuator; and
in modifying the logical to physical mapping, reassigning logical addresses for at least a portion of the identified data to physical addresses corresponding to locations on the at least one disk surface that are accessed by the second actuator.

16. The method of claim 12, further comprising:
receiving a write command to store data in the DSD; and
wherein modifying the logical to physical mapping includes assigning at least one logical address for the data from the write command to at least one physical address corresponding to one or more locations on the at least one disk surface.

17. The method of claim 16, further comprising assigning the at least one logical address to at least one physical address corresponding to one or more locations accessed by an actuator that has a lowest workload of the plurality of actuators or a workload below a threshold level.

18. The method of claim 12, further comprising:
associating logical address ranges for data with a current or predicted frequency of access of the data; and
in modifying the logical to physical mapping, assigning or reassigning logical addresses associated with current or predicted frequent access to physical addresses corresponding to locations on the at least one disk surface accessed by an actuator with a lower workload than another actuator of the plurality of actuators.

19. The method of claim 12, further comprising:
associating logical address ranges for data with a current or predicted frequency of access of the data; and
in modifying the logical to physical mapping, assigning or reassigning logical addresses associated with current or predicted infrequent access to physical addresses corresponding to locations on the at least one disk surface accessed by an actuator with a greater workload than another actuator of the plurality of actuators.

20. The method of claim 12, wherein each workload of the at least one workload corresponds to a number of commands to move a respective actuator of the plurality of actuators or a distance travelled by a respective actuator of the plurality of actuators.

21. A Data Storage Device (DSD), comprising:
at least one disk surface for storing data;
a plurality of actuators for accessing data stored on the at least one disk surface, wherein at least one of the actuators is configured to be moved independently from another one of the actuators; and
a controller configured to:
determine an indication of an amount of movement for each of at least two of the plurality of actuators; and
based on at least one determined indication of an amount of movement, modify a logical to physical mapping associating logical addresses of data with physical locations for storing the data on the at least one disk surface.

22. The DSD of claim 21, wherein the at least one determined indication of an amount of movement is based on a number of commands to move an actuator or a distance travelled by the actuator.

* * * * *